United States Patent
Kang

(10) Patent No.: US 7,648,116 B2
(45) Date of Patent: Jan. 19, 2010

(54) APPARATUS FOR ABSORBING VIBRATIONS OF COMPONENTS OF HEAVY CONSTRUCTION EQUIPMENT

(75) Inventor: Hyun Seok Kang, Busan (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 11/821,388

(22) Filed: Jun. 22, 2007

(65) Prior Publication Data

US 2008/0017781 A1 Jan. 24, 2008

(30) Foreign Application Priority Data

Jul. 20, 2006 (KR) ............ 10-2006-0067983

(51) Int. Cl.
*A47G 1/16* (2006.01)
(52) U.S. Cl. ............ 248/475.1; 248/562; 359/838
(58) Field of Classification Search ............ 248/560, 248/562, 564, 573, 634, 658, 351, 357, 475.1, 248/489; 52/150, 152; 359/838, 841, 844, 359/871, 875
See application file for complete search history.

(56) References Cited

U.S. PATENT DOCUMENTS 1,249,848 A * 12/1917 Sprague .......... 52/150
1,304,726 A * 5/1919 Bailey ............ 248/351
1,840,046 A * 1/1932 Mckee ............ 285/30
3,334,867 A * 8/1967 Wenaas ........... 256/35
4,135,788 A * 1/1979 Sargis ............ 359/842
4,380,369 A * 4/1983 Schacht .......... 359/842
4,433,899 A * 2/1984 Sellet et al. ...... 359/842
5,199,677 A * 4/1993 Sessions ......... 248/218.4
5,295,652 A 3/1994 Byrne

FOREIGN PATENT DOCUMENTS

| DE | 93 13 680 | 12/1993 |
|----|-----------|---------|
| DE | 103 00 647 | 7/2004 |
| DE | 20 2004 012 804 U1 | 11/2004 |
| EP | 0 077 195 A2 | 4/1983 |
| EP | 0 077 195 A3 | 4/1983 |

* cited by examiner

*Primary Examiner*—Alfred Joseph Wujciak, III
(74) *Attorney, Agent, or Firm*—Ladas & Parrry LLP

(57) ABSTRACT

An apparatus for absorbing vibrations of components of heavy construction equipment is disclosed, which comprises an elastic support ring which has a tightening part at both ends of a longitudinally extended body for thereby absorbing and decreasing vibrations transferred from heavy construction equipment to components by connecting and fixing the fixing part and the vibration part as the elastic support ring is tightened wherein the apparatus for absorbing vibrations of components of heavy construction equipment is installed between a fixing part for mounting components of heavy construction equipment such as a handrail, work mirror, etc. and a vibration part which generates lots of vibrations for thereby absorbing and decreasing vibrations of components of heavy construction equipment.

2 Claims, 3 Drawing Sheets

APPARATUS FOR ABSORBING VIBRATIONS OF COMPONENTS OF HEAVY CONSTRUCTION EQUIPMENT

CROSS-REFERENCE TO RELATED APPLICATION

This application is based on and claims priority from Korean Patent Application No. 10-2006-67983 filed on Jul. 20, 2006 in the Korean Intellectual Property Office, the disclosure of which is incorporated herein in its entirety by reference.

BACKGROUND OF THE INVENTION

1. Field of the Invention

The present invention relates to an apparatus for absorbing vibrations of components of heavy construction equipment, and in particular to an apparatus for absorbing vibrations of heavy construction equipment in which the vibrations of components of heavy construction equipment can be effectively absorbed by distributing and absorbing the vibrations of components of heavy construction equipment such as a cabin mirror or a handrail of heavy construction equipment in the course of work.

2. Description of the Background Art

Heavy construction equipment such as an excavator, loader, etc. generates lots of vibrations in the course of work. Since the above heavy construction equipment operates under a worse work environment for long time, the components are applied with lots of vibrations generating for long time.

In the above work environment, components such as cabin mirror or handrail are installed at the specified point because of recognizing the circumference of their machine. Since the components of heavy construction equipment are directly received by the large amount of vibrations on working, these components are under the mechanical fatigue and stress, after all they might be cracked and broken by the vibration durability.

FIG. 1 is a schematic view of a vibration state of a work mirror installed by outside of conventional heavy construction equipment. As shown therein, a work mirror 2 is fixed at one side of a handrail 1 so that a driver can have a better and wider viewing angle.

Here, when the work mirror 2 is fixed, it is needed to fix a fixing bar 3 at a fixing part 20 formed in a body and driver's cab of heavy construction equipment. A mirror holder 4 is attached at a front end of the fixing bar 3. A support end 3a is provided at one side of the fixing bar 3 and is attached on a work mirror mounting part 5 of the handrail 1. A vibration end 3b fixes the mirror holder 4 in a cantilever is structure with a certain interval L from the handrail 1 at the other end of the fixing bar 3.

In the above construction, the vibrations of equipment are transferred to the work mirror 2 via the fixing bar 3. When the work mirror vibrates a lot, the driver of heavy construction equipment has many problems in the course of work.

Since the components of conventional heavy construction equipment are applied with lots of vibrations in the course of work, the durability of such components is worsened. In worse case, the components or mounting portions may be cracked and broken.

It is not easy to specially design the fixing bar, handrail and work mirror for effectively absorbing and decreasing the vibrations of the work mirror and work mirror mounting portions among the components of conventional heavy construction equipment. Since the above special designs should be differently performed for each model of heavy construction equipment, it is not economical.

SUMMARY OF THE INVENTION

Accordingly, it is an object of the present invention to provide an apparatus for absorbing vibrations of components of heavy construction equipment in which a vibration distribution path of components is formed by installing a vibration absorbing apparatus between a mounting part in which components such as a work mirror is installed and a vibration end in which vibrations occur most, so that mechanical fatigue and stress generating at the components and mounting portions owing to the vibrations of equipment can be effectively prevented. In addition, the vibration absorbing apparatus can be easily attached and detached.

To achieve the above objects, an apparatus for absorbing vibrations of components of heavy construction equipment which is installed between a fixing part for mounting components of heavy construction equipment such as a handrail, can absorb and decrease the large amount of vibrations of heavy construction equipment components.

This apparatus comprises an elastic support ring which has a tightening part at both ends of a longitudinally extended body for thereby absorbing and decreasing vibrations transferred from heavy construction equipment to components by connecting and fixing the fixing part and the vibration part as the elastic support ring is tightened.

The elastic support ring includes a tightening part, of which one side is open, and is integral with the body.

The electric support ring and the body are formed of elastic members having smooth and tough properties(suitable spring and damping coefficient).

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The apparatus for absorbing vibrations of components of heavy construction equipment according to an embodiment of the present invention will be described with reference to the accompanying drawings.

Figure 1:
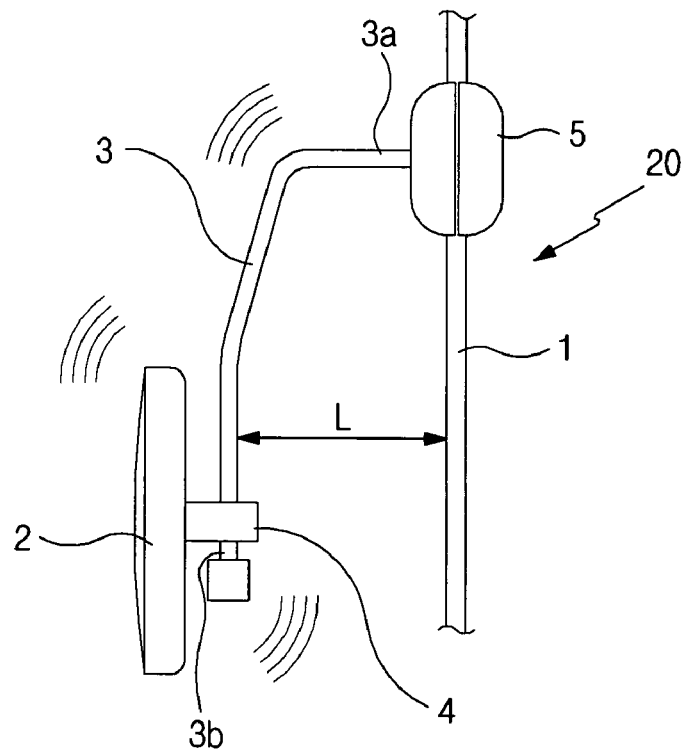
FIG. 1 is a schematic view illustrating a vibration state of a work mirror installed at a body of heavy construction equipment among components of conventional heavy construction equipment.
Figure 2:
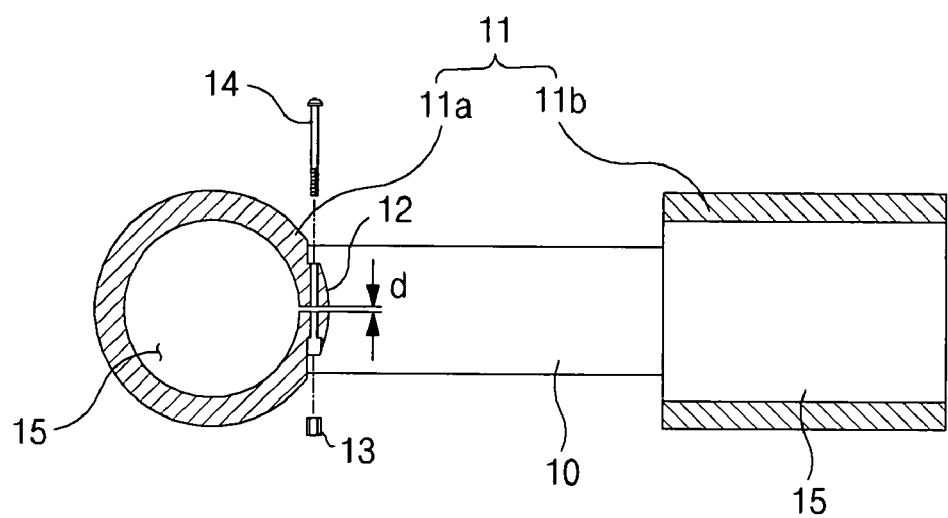
FIG. 2 is a partial cross sectional view illustrating an apparatus for absorbing vibrations of components of heavy construction equipment according to an embodiment of the present invention.
Figure 3:
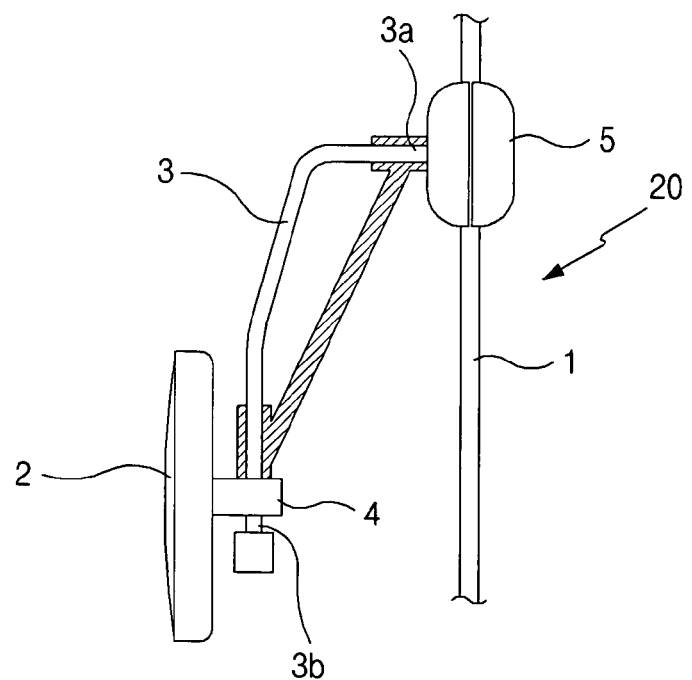
FIGS. 3 and 4 are views illustrating an use states of an apparatus for absorbing vibrations of components of heavy construction equipment according to an embodiment of the present invention.
Figure 4:
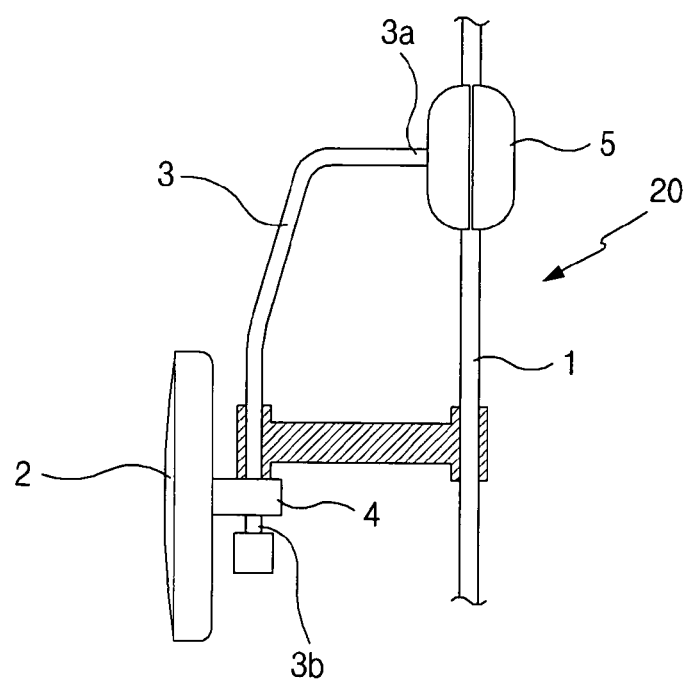
Figure 5:
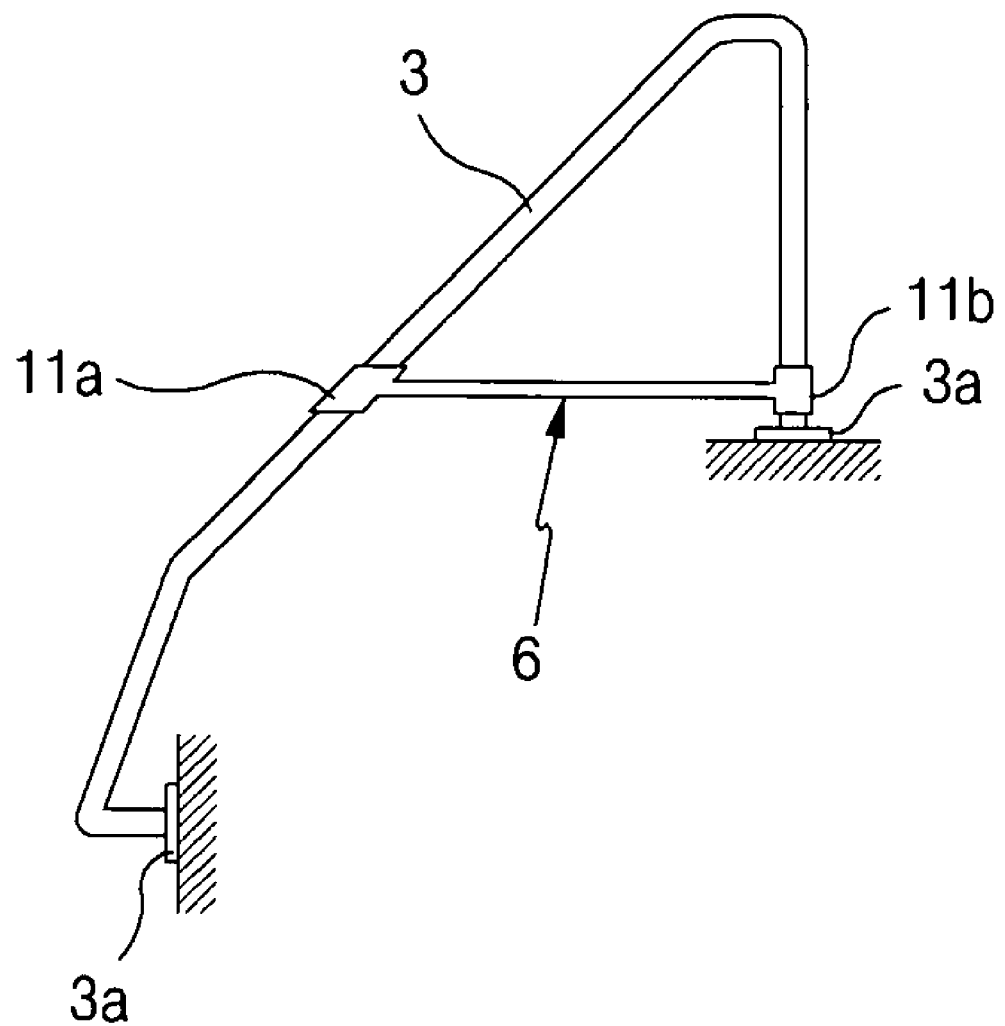
FIG. 5 is a schematic view illustrating another use state of an apparatus for absorbing vibrations of components of heavy construction equipment according to another embodiment of the present invention.

FIG. 2 is a partial cross sectional view illustrating an apparatus for absorbing vibrations of components of heavy construction equipment according to an embodiment of the present invention, FIGS. 3 and 4 are views illustrating the use states of an apparatus for absorbing vibrations of components of heavy construction equipment according to an embodiment of the present invention, and FIG. 5 is a schematic view illustrating another use state of an apparatus for absorbing vibrations of components of heavy construction equipment according to another embodiment of the present invention.

In the embodiment of the present invention, an elastic support ring 11 is preferably integrally installed in such a manner that elastic support rings 11a and 11b are prepared at both longitudinal sides of a body 10.

Here, the elastic support ring 11 has tightening parts 11a and 11b, and has a hole 15 contacting with an outer surface of a fixing part 11a and a vibration part 11b of the fixing bar 3, respectively. A through hole 15 having a mounting groove is formed in the tightening part 11b. The fixing bar 3 is fixed with a fixing member 14 within a tightening range "d" in the tightening part 11b.

According to the embodiment of the present invention, as shown in FIGS. 3 and 4, the tightening part 11a of one side of the elastic support ring 11 is fixed at a vibration part 3b of the fixing bar 3. The tightening part 11b of the other side is fixed at an outer surface of the fixing bar 3 such as the machine itself.

In another embodiment of the present invention, as shown in FIG. 5, the elastic support rings 11a and 11b may be fixed so that the body 6 of the hand rail 1 is supported at an approximately intermediate portion of the fixing bar 3 for thereby obtaining the same function for absorbing the vibrations of equipment.

The operation and effects of the apparatus for absorbing vibrations of components of heavy construction equipment according to the present invention will be described.

The vibrations of construction equipment's components are directly transferred to related components in the course of work. In the apparatus for absorbing vibrations of components of heavy construction equipment, the elastic support rings 11a and 11b are engaged near the mounting potion 5, and the mirror holder 4 which first receives the vibrations with the highest level.

Here, the fixing bar 3 is fixed at the mounting portion 5 of the handrail 1 with a certain elastic force of the elastic support rings 11a and 11b and the body 20 of the hand rail 1 which are supported with the tightening part 12. So, the vibrations transferred from the handrail 1 and body 20 to the work mirror 2 are effectively absorbed and decreased with the help of elastic and damping forces.

As a result of the test which was performed using the vibration absorbing apparatus according to the present invention with respect to the work mirror 2 and the fixing part 3a of the hand rail 1 of heavy construction equipment, the RMS (Root Mean Square) vibration levels measured at the mirror holder 4, which receives lots of vibrations, the mounting portion 5, and the support end 3a was decreased about 30% as compared to when the vibration absorbing apparatus is not installed.

When the vibration absorbing apparatus according to the present invention is installed, since the vibrations of the components such as the work mirror, the fixing bar and the handrail, and the mounting portions can be concurrently decreased, it is possible to significantly enhance the durability of components with respect to the vibrations of heavy construction equipment.

When the vibration absorbing apparatus according to another embodiment of the present invention is adapted to engineering cantilever and both end-fixed rod having a certain interval L from heavy construction equipment, the body 10 and the elastic support rings 11a and 11b are preferably installed at the portions, which receive vibrations with the highest level in the handrail 1, and the mounting portions. So, it is possible to most effectively absorb and decrease the vibrations occurring at the intermediate portion of the handrail 1 which means nodal point of structure. The detailed description on the above operation will be omitted.

In the present invention, the apparatus for absorbing vibrations of components of heavy construction equipment can significantly prevent mechanical fatigue and stress owing to the vibrations of the handrail, so that the reliability of the components of heavy construction equipment can be significantly enhanced.

The apparatus for absorbing vibrations of components of heavy construction equipment according to the present invention is able to most effectively absorb and decrease vibrations using the elastic structure and material having vibration absorbing functions. Any modifications to the above disclosed descriptions are obvious to those who skilled in the art.

As described above, since the apparatus for absorbing vibrations of components of heavy construction equipment according to the present invention is installed between the mounting portions, in which components of heavy construction equipments are mounted, and the vibration parts in which vibrations occur at most for thereby effectively absorbing and decreasing the vibrations and preventing mechanical fatigue and stress of components, so that the durability of components is enhanced. The apparatus for absorbing vibrations of components of heavy construction equipment according to the present invention can be easily attached or detached from the handrail, work mirror or fixing bar, and the absorption and decrease of vibrations may be maximized in the present invention.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In an apparatus for absorbing vibrations of components of heavy construction equipment which is installed in mounting components of heavy construction equipment, the apparatus including a hand rail 1 having a work mirror mounting part 5 formed in the hand rail 1, a work mirror 2 including a mirror holder 4, a fixing bar 3 having a fixing part 3a for fixing the work mirror 2 with the work minor mounting part 5 of the hand rail 1, and a vibration part 3b for attaching the mirror holder 4 adjacent to an end of the fixing bar 3, the apparatus further comprising:

an elastic support ring which has a tightening part at both ends of a longitudinally extended body for thereby absorbing and decreasing vibrations transferred from heavy construction equipment to components by connecting and fixing between the fixing part and the vibration part as the elastic support ring is tightened, wherein the elastic support ring includes one of the tightening parts formed at one end of the support ring for contacting, and fixed with an outer surface of the fixing part, and which has a hole and is integrated with the support ring, and the other of the tightening parts formed at the other end of the support ring for attaching with an outer surface of the vibration part and which has a hole opened for being attached at the outer surface of the vibration part adjacent to the mirror holder with a fixing member within a certain amount of tightening range.

2. The apparatus of claim 1, wherein said elastic support ring and said body are formed of elastic members having smooth and tough properties.

* * * * *